(12) United States Patent
Ramesh

(10) Patent No.: US 9,592,560 B2
(45) Date of Patent: Mar. 14, 2017

(54) CUTTING INSERT WITH A LINEAR AND A CONCAVE CUTTING EDGE PORTION

(71) Applicant: KENNAMETAL INDIA LIMITED, Bangalore (IN)

(72) Inventor: Karthic Ramesh, Bangalore (IN)

(73) Assignee: KENNAMETAL INDIA LIMITED, Bangalore (IN)

(*) Notice: Subject to any disclaimer, the term of this patent is extended or adjusted under 35 U.S.C. 154(b) by 62 days.

(21) Appl. No.: 14/190,454

(22) Filed: Feb. 26, 2014

(65) Prior Publication Data
US 2014/0286719 A1 Sep. 25, 2014

(30) Foreign Application Priority Data
Mar. 22, 2013 (IN) .......................... 1249/CHE/2013

(51) Int. Cl.
*B23B 51/00* (2006.01)
*B23B 51/04* (2006.01)
*B23B 27/14* (2006.01)

(52) U.S. Cl.
CPC .......... *B23B 51/048* (2013.01); *B23B 27/141* (2013.01); *B23B 2200/0471* (2013.01); *B23B 2200/08* (2013.01); *B23B 2200/083* (2013.01); *B23B 2200/087* (2013.01); *B23B 2200/20* (2013.01); *B23B 2200/201* (2013.01); *B23B 2200/202* (2013.01); *B23B 2200/204* (2013.01);
(Continued)

(58) Field of Classification Search
CPC .......... B23B 2251/50; B23B 2251/505; B23B 51/048; B23B 2200/08; B23B 2200/083; B23B 2200/20; B23B 2200/201; B23B 2200/202; Y10T 408/905
See application file for complete search history.

(56) References Cited

U.S. PATENT DOCUMENTS 3,145,791 A 8/1964 Schlossin
3,785,236 A 1/1974 Peterson
(Continued)

FOREIGN PATENT DOCUMENTS

AT WO 2013003874 A1 * 1/2013 ........... B23B 27/145
EP 0222951 5/1987
(Continued)

OTHER PUBLICATIONS

Jul. 15, 2016 Office action (3 months), U.S. Appl. No. 14/511,331. Oct. 24, 2016.

*Primary Examiner* — Sunil K Singh
*Assistant Examiner* — Chwen-Wei Su
(74) *Attorney, Agent, or Firm* — Matthew S. Bedsole

(57) ABSTRACT

A cutting insert includes a top face, a bottom face and a plurality of side walls extending between the top face and the bottom face. A peripheral cutting edge is defined at the juncture of each side wall and the top face. Each cutting edge includes a linear cutting edge portion and a concave cutting edge portion that curves inwardly in a plane that is perpendicular to a plane containing a central axis of the cutting insert. A radiused corner portion connects two adjacent cutting edges. Each linear cutting edge portion extends from one radiused corner portion to the concave cutting edge portion and the concave cutting edge portion extends from the linear cutting edge portion to another radiused corner portion.

19 Claims, 4 Drawing Sheets

(52) U.S. Cl.
CPC ..... *B23B 2251/50* (2013.01); *B23B 2251/505* (2013.01); *Y10T 407/23* (2015.01); *Y10T 407/235* (2015.01); *Y10T 408/89* (2015.01); *Y10T 408/905* (2015.01)

(56) References Cited

U.S. PATENT DOCUMENTS

| | | | |
|---|---|---|---|
| 4,010,526 | A | 3/1977 | Shephard |
| 4,218,877 | A | 8/1980 | McLain |
| 4,659,264 | A | 4/1987 | Friedline |
| 4,681,488 | A | 7/1987 | Markusson |
| 4,762,372 | A | 8/1988 | Rassmann et al. |
| 5,082,401 | A | 1/1992 | Niebauer |
| 5,203,649 | A | 4/1993 | Katbi et al. |
| 5,246,315 | A | 9/1993 | Hansson et al. |
| 5,324,144 | A | 6/1994 | Katbi et al. |
| 5,472,027 | A | 12/1995 | Ackerman |
| 5,743,681 | A | 4/1998 | Wiman et al. |
| 5,921,721 | A * | 7/1999 | Hintze ............... B23B 27/1622 407/113 |
| 6,074,137 | A | 6/2000 | Betman et al. |
| 6,257,807 | B1 | 7/2001 | Heinloth |
| 6,352,538 | B2 | 3/2002 | McGuire et al. |
| 6,508,612 | B1 | 1/2003 | Baca |
| 6,742,969 | B1 | 6/2004 | Hoefler |
| 6,769,844 | B2 | 8/2004 | Waggle |
| 6,884,006 | B2 | 4/2005 | Nagashima |
| 7,393,160 | B2 | 7/2008 | Volokh |
| 7,677,845 | B2 | 3/2010 | Limell |
| 7,909,544 | B2 | 3/2011 | Jansson |
| 8,157,489 | B2 | 4/2012 | Wolf |
| 9,272,335 | B2 | 3/2016 | Ramesh |
| 2002/0061235 | A1 * | 5/2002 | Maier ................ B23B 27/141 407/113 |
| 2003/0031520 | A1 | 2/2003 | Hintze et al. |
| 2003/0075032 | A1 | 4/2003 | Porper |
| 2003/0180103 | A1 | 9/2003 | Nagaya et al. |
| 2006/0029475 | A1 * | 2/2006 | Scherbarth ............. B23B 5/26 407/113 |
| 2006/0280567 | A1 | 12/2006 | Craig |
| 2010/0080662 | A1 | 4/2010 | Satran et al. |
| 2010/0178122 | A1 * | 7/2010 | Bae ..................... B23B 51/048 408/223 |
| 2011/0038677 | A1 | 2/2011 | Sung et al. |
| 2011/0129310 | A1 | 6/2011 | Dessoly et al. |
| 2012/0087751 | A1 | 4/2012 | Yamaguchi |
| 2013/0022422 | A1 | 1/2013 | Ramesh |
| 2013/0022423 | A1 | 1/2013 | Ramesh |
| 2013/0315684 | A1 | 11/2013 | Ramesh |
| 2014/0212235 | A1 | 7/2014 | Prast et al. |
| 2016/0023282 | A1 | 1/2016 | Ramesh |

FOREIGN PATENT DOCUMENTS

| | | | |
|---|---|---|---|
| EP | 0241973 | | 10/1987 |
| EP | 0269103 | | 6/1988 |
| EP | 2394766 | | 12/2011 |
| GB | 2157205 | | 10/1985 |
| JP | 05228716 | A * | 9/1993 |
| JP | 09272006 | A * | 10/1997 |
| JP | 10193213 | A * | 7/1998 |
| JP | 2003275919 | A * | 9/2003 |
| JP | 2012086303 | A * | 5/2012 |
| WO | 2013016018 | | 1/2013 |

\* cited by examiner

CUTTING INSERT WITH A LINEAR AND A CONCAVE CUTTING EDGE PORTION

CROSS-REFERENCE TO RELATED APPLICATION

This application claims the benefit of Indian Application Number 1249/CHE/2013 filed Mar. 22, 2013, which is hereby fully incorporated herein by reference.

BACKGROUND OF THE INVENTION

The invention pertains generally to a cutting insert to be used in cutting tools during machining operations. More specifically, the invention pertains to a cutting insert having a linear and a concave cutting edge portion.

Cutting inserts of various geometries for use with many types of cutting tools during a machining operation are generally known. One example is various types of drilling tools that are used to drill or bore cylindrical holes in metal work pieces. The cutting or boring action of the drill tools may be carried out by an elongated, substantially cylindrical drilling tool that is typically attached to a tool holder/driving apparatus on one end and contains one or more cutting inserts on the opposing end for engaging the work piece. The use of replaceable cutting inserts is generally known and allows for quick changing of the insert upon wear of the cutting surfaces of the cutting insert, as well as allows for one drilling tool to be used for a variety of different drilling or boring applications by simply changing the insert and not the entire drilling tool assembly. In addition, indexable cutting inserts are commonly used such that multiple sides of the cutting insert can be used for cutting to prolong the useful life of the cutting insert.

Once a cutting insert engages a work piece, there are substantial forces that act on or are applied to the cutting insert. These forces in turn have a direct impact on the nature and quality of the cutting operation, i.e., the nature and quality of the cutting, drilling or boring action on the work piece.

The manufacture and installation/replacement of cutting inserts can be costly and time consuming. Thus, it is important that cutting inserts be durable and wear resistant while still being able to effectively provide the desired cutting operation.

Accordingly, there is a continual need for improved cutting inserts that overcome disadvantages, limitations and shortcomings of known cutting inserts. For example, there is a continual need for improved cutting inserts that can effectively absorb the cutting forces and reduce/minimize the amount of force acting upon the cutting insert during a cutting operation. In another example, there is a continual need for improved cutting inserts that have improved durability and wear resistance.

SUMMARY OF THE INVENTION

In accordance with an aspect of the invention, a cutting insert includes a top face, a bottom face and a plurality of side walls extending between the top face and the bottom face. A central axis of the cutting insert extends through the top face and the bottom face. A peripheral cutting edge is defined at the juncture of each side wall and the top face. Each cutting edge includes a linear cutting edge portion and a concave cutting edge portion that curves inwardly in a plane that is perpendicular to a plane containing the central axis. A radiused corner portion connects two adjacent cutting edges. Each linear cutting edge portion extends from one radiused corner portion to the concave cutting edge portion and each concave cutting edge portion extends from the linear cutting edge portion to another radiused corner portion.

In accordance with another aspect of the invention, a cutting insert includes an indexable, polygonal insert body having a top face, an opposing bottom seating surface and a plurality of side walls extending between the top face and the bottom seating surface. The cutting insert also includes a peripheral cutting edge defined at the intersection of each side wall and the top face, each cutting edge including a linear cutting edge portion and a concave cutting edge portion that has a greater length than the linear cutting edge portion. The concave cutting edge portion curves inwardly in a plane that is perpendicular to a plane containing a central axis of the cutting insert that extends through the top face and the bottom seating surface. The insert body further includes a radiused corner portion connecting two adjacent cutting edges.

In accordance with yet another aspect of the invention, a drilling tool includes a tool body having an axial rearward end having a shank portion and an axial forward end that defines an insert pocket. The drilling tool also includes a cutting insert structured and arranged to be removably received in the insert pocket of the tool body. The cutting insert includes a top face, a bottom seating surface and a plurality of side walls extending between the top face and the bottom seating surface. A peripheral cutting edge is defined at the juncture of each side wall and the top face. Each cutting edge includes a linear cutting edge portion and a concave cutting edge portion that curves inwardly in a plane that is perpendicular to a plane containing the central axis. A radiused corner portion connects two adjacent cutting edges. Each linear cutting edge portion extends from one radiused corner portion to the concave cutting edge portion and each concave cutting edge portion extends from the linear cutting edge portion to another radiused corner portion.

These and other aspects of the present invention will be more fully understood following a review of this specification and drawings.

DETAILED DESCRIPTION

The following description is for purposes of illustrating various aspects of the invention only and not for purposes of limiting the scope of the invention.

Figure 1:
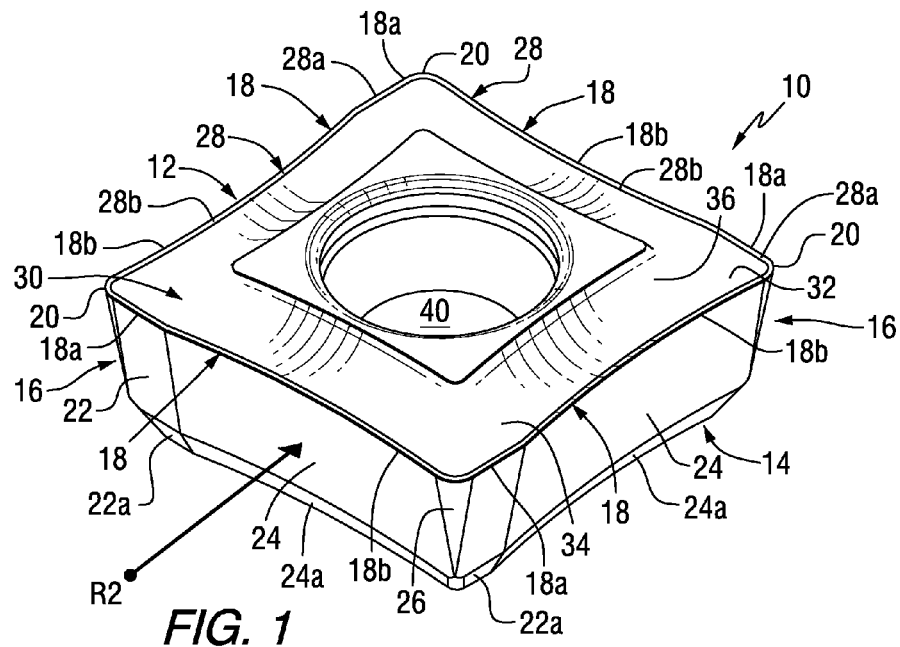
FIG. 1 is an isometric view of a cutting insert, in accordance with an aspect of the invention.
Figure 2:
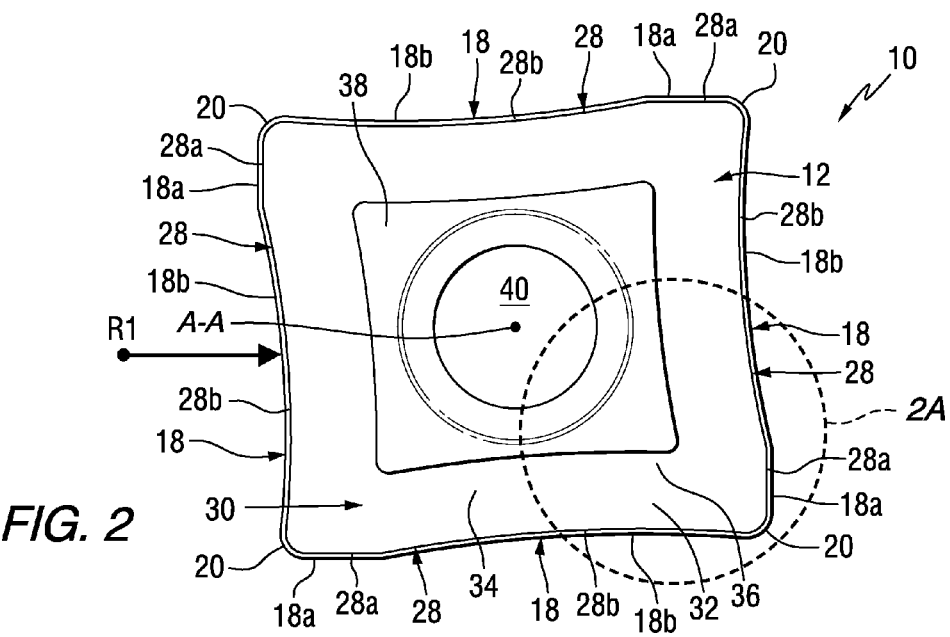
FIG. 2 is a top view of the cutting insert shown in FIG. 1, in accordance with an aspect of the invention.
Figure 2A:
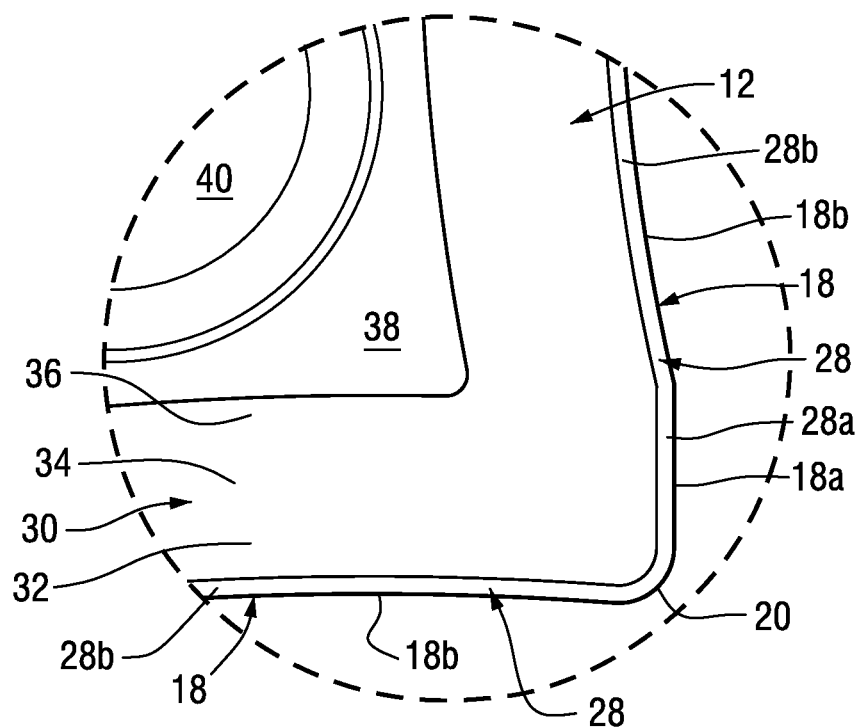
FIG. 2A is an enlarged, partial top view of a corner portion of FIG. 2, in accordance with an aspect of the invention.
Figure 3:
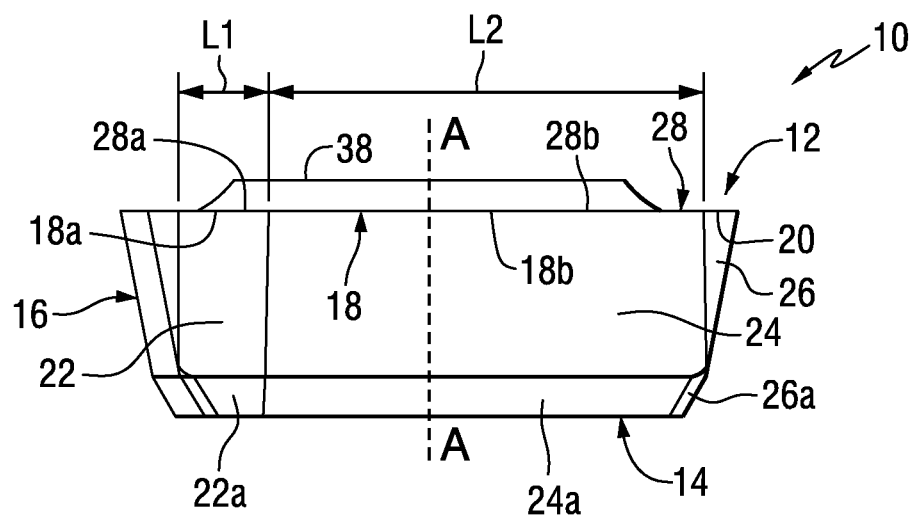
FIG. 3 is a front elevational view of the cutting insert shown in FIGS. 1 and 2, in accordance with an aspect of the invention.

Referring to FIGS. 1-3, there is illustrated a cutting insert, generally designated as reference number 10, in accordance with an aspect of the invention. The cutting insert 10 includes a top face 12 (which may also be referred to as a rake face), a bottom face 14 (which may also be referred to as a seating surface or bottom seating surface) and a plurality of side walls 16 (which may also be referred to as flanks or flank faces) extending between the top face 12 and the bottom face 14. The cutting insert 10 includes a central axis A-A that extends through or passes through the top face 12 and the bottom face 14.

In one aspect, the body of the cutting insert 10 is structured and arranged to be polygonal. While a generally a generally square cutting insert 10 having four sides is shown in the drawings for illustrative purposes only, it will be appreciated that other multi-sided or polygonal shapes (e.g. triangular, rectangular, pentagonal, etc.) may be utilized for the cutting insert of the present invention. In another aspect, the body of the cutting insert 10 is structured and arranged to be an indexable type cutting insert. In yet another aspect of the invention, the body of the cutting insert 10 is structured and arranged so that the side walls 16 slope or slant generally inwardly from the top face 12 to the bottom face 14 such that the bottom face is smaller than the top face 14.

Still referring to FIGS. 1-3, the cutting insert 10 also includes a peripheral cutting edge 18 defined at the juncture or intersection of each side wall 16 and the top face 12, in accordance with another aspect of the invention. Each cutting edge 18 includes a linear cutting edge portion 18a and a concave cutting edge portion 18b. In one aspect, the concave cutting edge portion 18b curves inwardly in a plane that is perpendicular to a plane containing the central axis, as illustrated, for example, FIG. 2. In one example, the concave cutting edge portion 18b curves inwardly in the plane of the top face 12 as shown in the top view of FIG. 2.

In another aspect, one or more of the concave cutting edge portions 18b can curve inwardly in a plane that contains one or more of the other concave cutting edge portions 18b.

The cutting insert 10 further includes a radiused corner portion 20 that connects two adjacent cutting edges 18. In one aspect, each radiused corner portion 20 connects a linear cutting edge portion 18a of one cutting edge 18 to a concave cutting edge portion 18b of an adjacent cutting edge 18.

The linear cutting edge portion 18a is generally a linear or straight edge that extends from a corresponding radiused corner portion 20 to where it meets the concave cutting edge portion 18b. In one aspect, the linear cutting edge portion 18a has a length L1 in the range of about 0.1 mm to about 12 mm.

The concave cutting edge portion 18b is generally a concave or inwardly curved edge that extends from a corresponding radiused corner portion 20 to where it meets the linear cutting edge portion 18a. In one aspect, the concave cutting edge portion 18b has a length L2 (measured, for example, linearly from one end of the concave cutting edge portion 18b adjacent a corresponding radiused corner portion 20 to the opposing end of the concave cutting edge portion 18b where it meets the linear cutting edge portion 18a) in the range of about 1 mm to about 30 mm. In one aspect, the concave cutting edge portion 18b has a greater length L2 than the length L1 of the linear cutting edge portion 18a, i.e. L2>L1. In another aspect, the ratio L2/(L1+L2)=about 80%. In yet another aspect, the range for the length L2 of cutting edge portion 18b is about 70% to about 90% of (L1+L2). In one example, the length L2 of cutting edge portion 18b is about 80% of (L1+L2)

In one aspect, the length L1 of the linear cutting edge 18a varies according to the relation: L1=about 20% of (L1+L2), for various insert sizes. In other words, L1/(L1+L2)=about 20%. In another aspect, the length of portion L1 of cutting edge 18a can be in the range of about 10% to about 30% of (L1+L2). In one example, the length of portion L1 of cutting edge 18a is about 20% of (L1+L2).

In another aspect of the invention, each side wall 16 includes a straight or flat side wall portion 22 adjacent the linear cutting edge portion 18a and extending generally downwardly from the linear cutting edge portion 18a toward the bottom face 14. The straight side wall portion 22 is a generally flat surface. In addition, the straight side wall portion 22 can extend continuously from the linear cutting edge portion 18a to the bottom face 14, or the straight side wall portion 22 can include a lower straight or flat side wall portion 22a adjacent the bottom face 14 that may slope or slant more inwardly than the straight side wall portion 22 to provide, for example, a seating surface or configuration for mounting the cutting insert 10 in a cutting tool, as will be described herein.

In another aspect of the invention, each side wall 16 also includes a concave side wall portion 24 adjacent the concave cutting edge portion 18b and extending generally downwardly from the concave cutting edge portion 18b toward the bottom face 14. The concave side wall portion 24 is a generally concave or inwardly curved surface. In addition, the concave side wall portion 24 can extend continuously from the concave cutting edge portion 18b to the bottom face 14, or the concave side wall portion 24 can include a lower concave side wall portion 24a adjacent the bottom face 14 that may slope or slant more inwardly than the concave side wall portion 24 to provide, for example, a seating surface or configuration for mounting the cutting insert 10 in a cutting tool.

In addition, a rounded corner side wall 26 is provided adjacent each radiused corner portion 20, wherein the rounded corner side wall 26 connects the concave side wall portion 18b of one side wall 16 with a straight side wall portion 18a of the adjacent side wall 16. The rounded corner side wall 26 can extend continuously from the radiused corner portion 20 to the bottom face 14, or the rounded corner side wall 26 can include a lower rounded corner side wall 26a adjacent the bottom face 14 that may slope or slant more inwardly than the rounded corner side wall 26.

The concave cutting edge portion 18b can have a radius R1 (see, for example, FIG. 2) in the range of about 1 mm to about 100 mm. The concave side wall portion 24 can have a radius R2 (see, for example, FIG. 1) in the range of about 0.8 mm to about 100 mm. In one aspect, the radius R2 of the concave side wall portion 24 is substantially the same as the radius R1 of the concave cutting edge portion 18b. In another aspect, the lower concave side wall portion 24a may also have a radius that is substantially the same as the radius R2 of the concave side wall portion 24. However, it will be appreciated that R1, R2 and/or the radius of the lower concave side wall portion 24a may have different radius dimensions as well.

Cutting edge 18 includes a top surface or portion 28 on or adjacent the top face 12 of the cutting insert 10. The top portion 28 includes a top portion 28a adjacent the linear cutting edge portion 18a and a top portion 28b adjacent the concave cutting edge portion 18b. The top portions that are contained in the same plane. In one aspect, the top portion 28 is contained in a single plane. In another aspect, the top portions 28a and 28b are contained in the same plane so as to form a straight, flat or continuous top portion 28 of the cutting edge 18 (see, for example FIG. 3).

The top face 12 can include a chip breaking groove 30 formed therein and extending alongside the cutting edges 18, in accordance with another aspect of the invention. The chip breaking groove 30 can extend partially or completely around periphery of the top face 12. The chip-breaking groove 30 includes a descending wall 32 which inclines downwardly from the cutting edges 18, e.g. downwardly from top portion 28 of the cutting edges 18, to a bottom area 34 of the chip breaking groove 30 and a back wall 36 which inclines upwardly from the bottom area 34 of the chip breaking groove 30. Advantageously, the chip breaking groove 30 provides for deflecting and/or bending the chips being removed from a work piece to improve the efficiency of the cutting insert 10.

The back wall 36 of the chip breaking groove 30 extends upwardly to a raised central top surface 38 of the top face 12 of the cutting insert 10. In one aspect, the raised central top surface 38 is elevated above the cutting edges 18. The raised central top surface 38 defines a mounting opening 40 that extends axially along axis A-A through the cutting insert 10.

Figure 4:
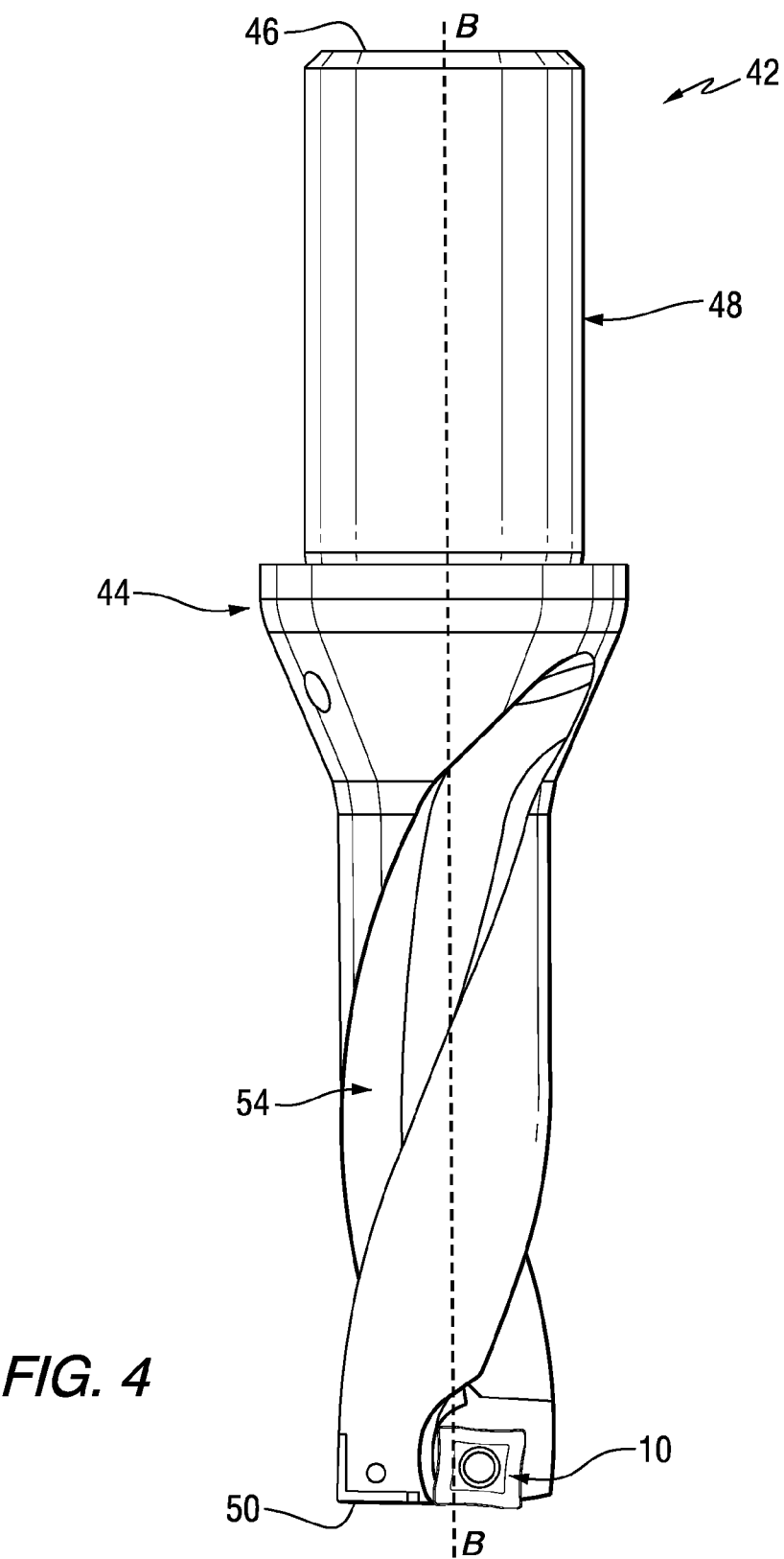
FIG. 4 is a view of a cutting tool, e.g. a drilling tool containing the cutting insert shown in FIGS. 1-3, in accordance with an aspect of the invention.
Figure 5:
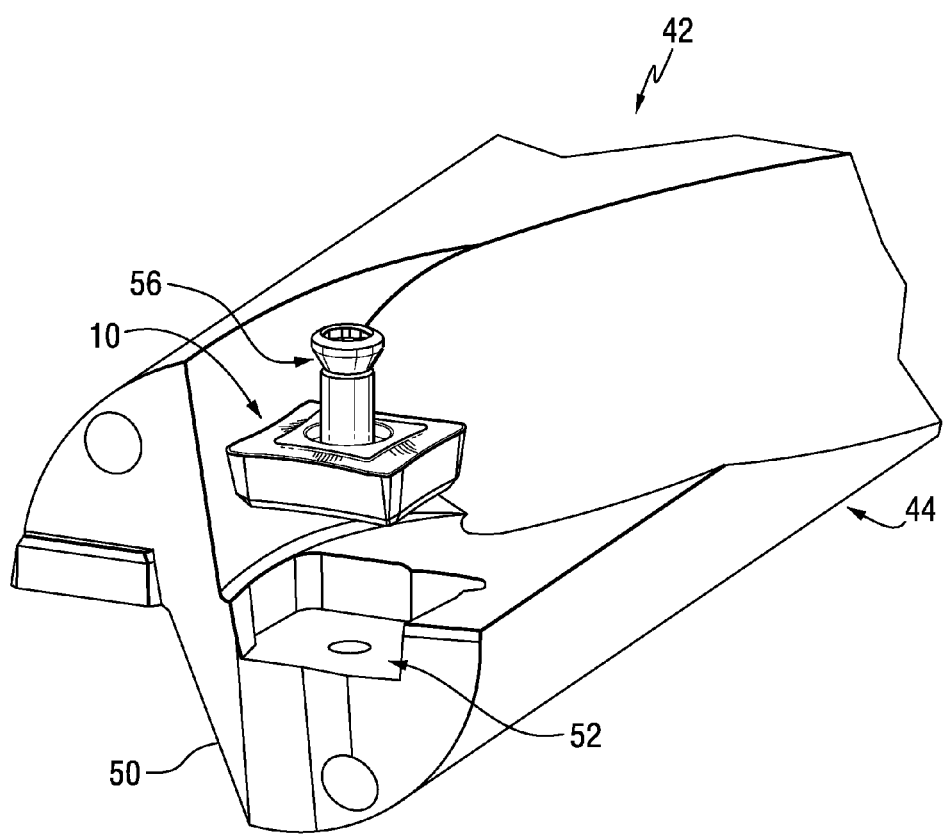
FIG. 5 is an enlarged, exploded view of an axial forward end of the drilling tool shown in FIG. 4, in accordance with another aspect of the invention.

Referring to FIGS. 4 and 5, there is illustrated a cutting tool, e.g. a drilling tool 42 for employing or utilizing one or more cutting inserts 10, in accordance with an aspect of the invention. The drilling tool 42 can include an elongated tool body 44 extending axially along elongated central axis B-B and having an axial rearward end 46 having a shank portion 48 and an axial forward end 50 that defines at least one insert pocket 52. The tool body 44 also can include flutes 54 formed therein. The cutting insert 10 is structured and arranged to be removably received in the insert pocket 52 of the tool body 44. In one aspect, the cutting insert 10 is received, positioned and/or mounted in the insert pocket 52 and held in place by an insert mounting screw 56 that is received in the mounting opening 40 of the cutting insert 10. It will be appreciated that other type cutting tools in addition to drilling tool 42 may be used in association with aspects of the invention.

Thus, it will be appreciated that the use of a combination of linear cutting edge 18a and concave cutting edge 18b promotes smoother and gradual engagement of the insert 10 into a workpiece during axial advancement of the cutting tool, e.g. drilling tool 42 towards the workpiece. At the same time, it also helps to stabilize the cutting forces and minimize lateral or radial drift of the drilling tool 42 during a cutting operation. This helps to keep within close tolerance the dimensional accuracy of the drilled hole in the workpiece.

Whereas particular aspects of this invention have been described above for purposes of illustration, it will be evident to those skilled in the art that numerous variations of the details of the present invention may be made without departing from the invention as defined in the appended claims.

What is claimed is:

1. A cutting insert, comprising:
    a top face;
    a bottom face, wherein a central axis of the cutting insert extends through the top face and the bottom face;
    a plurality of side walls extending between the top face and the bottom face;
    a peripheral cutting edge defined at the juncture of each side wall and the top face, each cutting edge including a linear cutting edge portion and a concave cutting edge portion, wherein the concave cutting edge portion is a curved edge that curves inwardly in a plane that is perpendicular to a plane containing the central axis; and
    a radiused corner portion connecting two adjacent cutting edges, wherein each linear cutting edge portion extends from one radiused corner portion to the concave cutting edge portion and each concave cutting edge portion extends from the linear cutting edge portion to another radiused corner portion.

2. The cutting insert of claim 1, wherein each side wall includes a flat side wall portion adjacent the linear cutting edge portion.

3. The cutting insert of claim 2, wherein each side wall further includes a concave side wall portion adjacent the concave cutting edge portion.

4. The cutting insert of claim 3, wherein the concave side wall portion has a radius that is substantially the same as a radius of the concave cutting edge portion.

5. The cutting insert of claim 3, further including a rounded corner side wall adjacent each radiused corner portion, wherein the rounded corner side wall connects the concave side wall portion of one side wall with a flat side wall portion of the adjacent side wall.

6. The cutting insert of claim 1, wherein the concave cutting edge portion has a greater length than the linear cutting edge portion.

7. The cutting insert of claim 1, wherein the concave cutting edge portion has a length in the range of about 1 mm to about 30 mm.

8. The cutting insert of claim 1, wherein the linear cutting edge portion has a length in the range of about 0.1 mm to about 12 mm.

9. The cutting insert of claim 1, wherein the concave cutting edge portion has a radius in the range of about 1 mm to about 100 mm.

10. The cutting insert of claim 1, wherein the top face includes a chip breaking groove formed therein and extending alongside the cutting edges, the chip-breaking groove including a descending wall which inclines downwardly from the cutting edges to a bottom area of the chip breaking groove and a back wall which inclines upwardly from the bottom area of the chip breaking groove.

11. The cutting insert of claim 10, wherein the back wall of the chip breaking groove extends upwardly to a raised central top surface of the top face of the cutting insert.

12. The cutting insert of claim 11, wherein the raised central top surface defines a mounting opening that extends axially through the cutting insert.

13. The cutting insert of claim 1, wherein the linear cutting edge portion and the concave cutting edge portion each include top portions that are contained in the same plane.

14. A cutting insert, comprising:
    an indexable, polygonal insert body having a top face, an opposing bottom seating surface and a plurality of side walls extending between the top face and the bottom seating surface;
    a peripheral cutting edge defined at the intersection of each side wall and the top face, each cutting edge including a linear cutting edge portion and a concave cutting edge portion that has a greater length than the linear cutting edge portion, wherein the concave cutting edge portion is a curved edge that curves inwardly in a plane that is perpendicular to a plane containing a central axis of the cutting insert that extends through the top face and the bottom seating surface; and
    the insert body further includes a radiused corner portion connecting two adjacent cutting edges, wherein each linear cutting edge portion extends from one radiused corner portion to the concave cutting edge portion and the concave cutting edge portion extends from the linear cutting edge portion to another radiused corner portion.

15. The cutting insert of claim 14, wherein each side wall includes a flat side wall portion adjacent the straight cutting edge portion and a concave side wall portion adjacent the concave cutting edge portion.

16. The cutting insert of claim 14, wherein the linear cutting edge portion and the concave cutting edge portion each include top portions that are contained in the same plane.

17. A drilling tool, comprising:
- a tool body having an axial rearward end having a shank portion and an axial forward end that defines an insert pocket; and
- a cutting insert structured and arranged to be removably received in the insert pocket of the tool body, the cutting insert comprising:
  - a top face;
  - a bottom seating surface, wherein a central axis of the cutting insert passes through the top face and the bottom seating surface;
  - a plurality of side walls extending between the top face and the bottom seating surface;
  - a peripheral cutting edge defined at the juncture of each side wall and the top face, each cutting edge including a linear cutting edge portion and a concave cutting edge portion, wherein the concave cutting edge portion is a curved edge that curves inwardly in a plane that is perpendicular to a plane containing the central axis; and
  - a radiused corner portion connecting two adjacent cutting edges, wherein each linear cutting edge portion extends from one radiused corner portion to the concave cutting edge portion and each concave cutting edge portion extends from the linear cutting edge portion to another radiused corner portion.

18. The drilling tool of claim 17, wherein each side wall includes a flat side wall portion adjacent the straight cutting edge portion and a concave side wall portion adjacent the concave cutting edge portion.

19. The drilling tool of claim 17, wherein the linear cutting edge portion and the concave cutting edge portion each include top portions that are contained in the same plane.

* * * * *